Patented Feb. 13, 1934

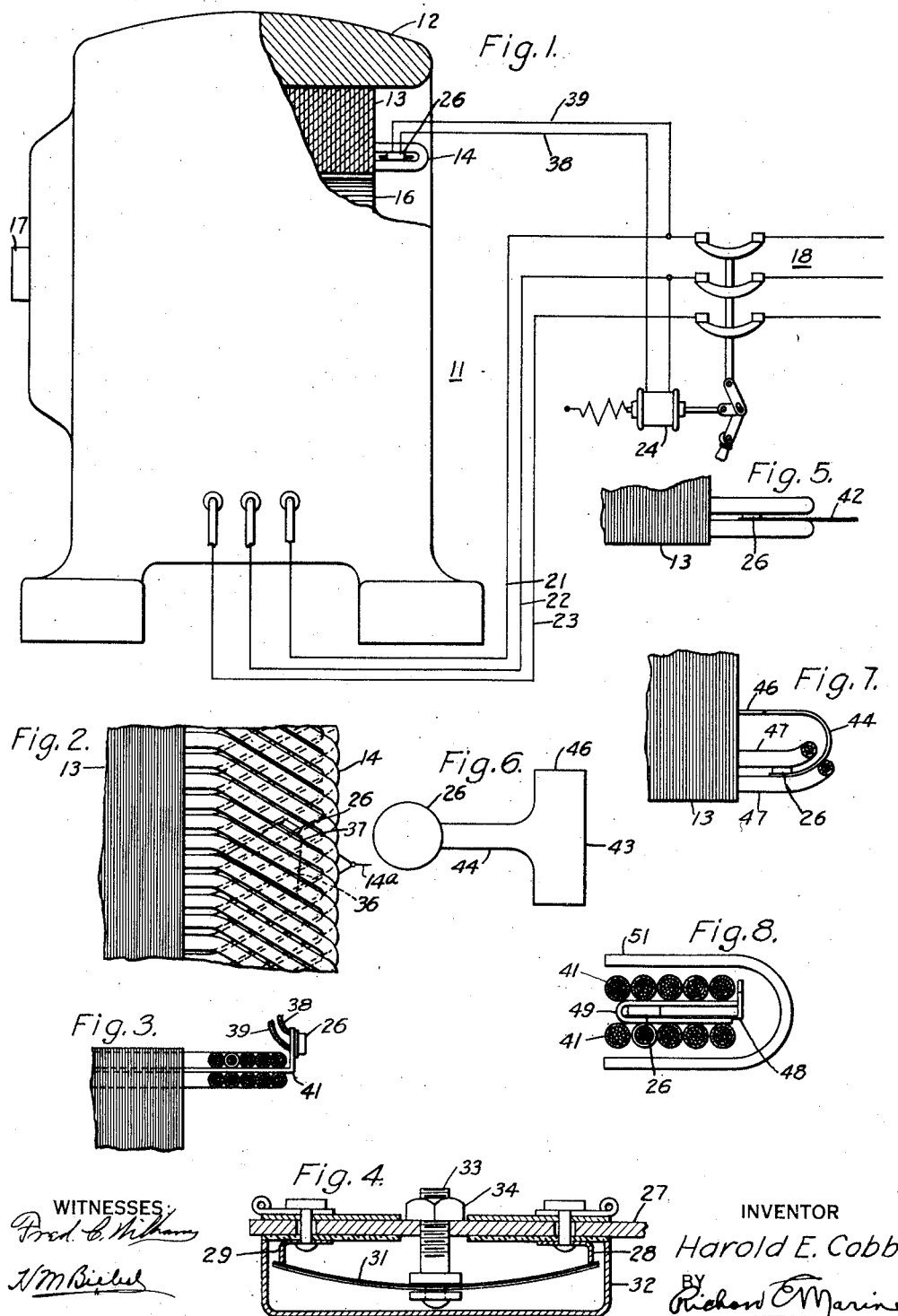

1,947,078

UNITED STATES PATENT OFFICE 1,947,078

MOTOR THERMAL RELAY

Harold E. Cobb, Wilkinsburg, Pa., assignor to Westinghouse Electric & Manufacturing Company, a corporation of Pennsylvania Application November 11, 1931
Serial No. 574,277

11 Claims. (Cl. 172—36)

My invention relates to relays and particularly to thermal relays.

An object of my invention is to provide a thermal relay operatively associated with an energy translating device, such as an electric motor, and more particularly with the end turn portions of the motor energizing winding to control the energization of the motor in accordance with the temperature conditions of the energizing winding.

Another object of my invention is to provide a thermal relay of relatively simple and rugged construction so located as to be in direct operative engagement with the energizing winding outside of the stator, and that shall be provided with means for conducting heat thereto from a plurality of individual end turn portions.

Another object of my invention is to provide a thermal relay that shall have means operatively associated therewith for ensuring a time lag of operation of the relay under moderate overload conditions on the motor and substantially instantaneous operation of the relay under extreme motor overload conditions.

Other objects will appear hereinafter in the course of the description of the various modifications of the device embodying my invention.

In the single sheet of drawing:

Figure 1 is a view, in side elevation, of a motor with a portion thereof cut away to show the location of the device particularly embodying my invention, this figure including also a schematic diagram of connections for the energizing winding of the motor, Fig. 2 is a fragmentary top plan view of a portion of the stator and of the associated energizing winding, Fig. 3 is a fragmentary view in side elevation of a modified form of device embodying my invention, shown in its operative position relative to the stator winding, Fig. 4 is a view in diametral section through one form of thermal relay embodying my invention, Fig. 5 is a fragmentary view in side elevation of another form of thermal relay embodying my invention shown in its operative position, relative to the energizing winding, Fig. 6 is a schematic top plan view of a thermal relay having a heat radiating member operatively associated therewith;

Fig. 7 is a fragmentary view in side elevation of a further modified form of device embodying my invention, and Fig. 8 is a fragmentary view in side elevation of a still further modification of my invention.

I wish to point out first of all that while I have illustrated and will hereinafter describe a specific form of thermally actuable element of a thermal relay I do not desire to be limited solely thereto, as my invention is not limited to any specific form of thermally actuable element, but resides more particularly in certain details of construction and in the location of a thermal relay relative to the energizing windings of an energy translating device, such as an electric motor, in order that the best possible protection may be given to the motor, not only under operating conditions involving a long continued moderate overload on the motor windings, but also under extreme overload conditions, such as may occur in case of a short circuit in the motor or in the stalling thereof because of an extremely heavy load thereon. Only such details have, therfore, been shown in the drawing, and will be specifically described as are illustrative of the more general ideas involved in the use of a thermal relay for the protection of an electric motor.

Referring first to Fig. 1 of the drawing, I have there shown a motor 11 having a frame 12, a stator 13 and an energizing winding 14, which may be of the usual kind utilized in single phase or polyphase induction motors, in which the stator energizing winding includes a plurality of double-layer overlapping end turn portions shown in somewhat greater detail in Fig. 2 of the drawing. Here again I wish to point out that, while I have shown an energizing winding including a plurality of formed multi-turn coils and formed or shaped end turn portions, my invention is not limited to this construction, as it may be used with other types of energizing windings which include end turn portions extending laterally of the stator laminations. I have illustrated also a rotor 16 mounted on a shaft 17, all of which are well known in the art.

Means for controlling the energizing circuit of the motor may include a circuit breaker 18, which, as shown in Fig. 1 of the drawing, is illustrated as a triple pole circuit breaker to control a three-phase energizing circuit for the stator windings, including more particularly the leads 21, 22 and 23 from the breaker to the terminals of the motor winding. A holding coil 24 is provided for the manually closable circuit breaker 18, and as long as this coil is energized, the circuit breaker will be held in its closed position.

I have illustrated a thermal relay 26 in Fig. 1 of the drawing, which is shown as being located between the upper and the lower layers of the end turn portions of the energizing winding 14, and, therefore, in direct operative engagement with the insulated end turn portions of the energizing winding, so that a thermally actuable element, constituting a part of the thermal relay and to be hereinafter described in detail, will receive heat from both the upper and lower layers of the energizing winding.

Reference may be had to Fig. 4 of the drawing for one form of device which I have used successfully in the protection of motors of this general type, and as may be noted from this figure, a base plate 27 has insulatedly mounted thereon a pair of substantially fixed contact members 28 and 29, which are engaged with or disengaged from a snap-acting bimetal disc 31, which may be of the general type disclosed and claimed in Patent No. 1,448,240 to J. A. Spencer. In brief, the disc 31 is so shaped or dished that it will operate with a snap action from one of two limiting positions to its other limiting position, and will also have a relatively large temperature differential between its two operating temperature values.

In conformity with the disc 31, the fixed contact terminals 28 and 29 may be of arcuate shape and of predetermined peripheral extent less than one-half of the circumference, so that good electric contact will be provided between the fixed and the movable contact members. A casing 32 is suitably secured over the disc 31 which is mounted in adjustable position on the base 27 by a stud 33 held in any desired position by a lock nut 34, the disc 31 being provided with a central aperture to loosely mount it on the other end of the screw-threaded stud 33.

Referring now to Fig. 2 of the drawing, I have there illustrated one form of thermostat 26 which is operatively supported on a heat conducting plate 36, which is located between the upper and lower layers of the end turn portions, so that it may receive heat from a plurality of adjacent sections of the energizing winding. The plate 36 has an integral radially outwardly extending portion 37 on which the relay 26 may be mounted. Leads 38 and 39 extend outwardly therefrom, as shown in Fig. 1 of the drawing, to one line conductor of the supply circuit and to one terminal of the holding coil 24 in a manner well known in the art.

Referring to Fig. 3 of the drawing, I have there illustrated more or less schematically the mounting of a relay 26 on a somewhat different form of supporting and heat conducting plate 41, whereby the thermal relay itself is located axially to one side of the end turn portions.

I find it highly desirable under certain conditions to make the plate 36 or the plate 41 of a metal or of an alloy which has a high heat conductivity, and I have found copper to be a very desirable metal to use because of its high heat conducting property. While I may mount the thermal relay illustrated in Fig. 4 of the drawing, on either of the metal plates 36 or 41, I may use the plate 36 or the plate 41 as the base 27 of the thermal relay, whereby the thermal mass of the relay itself is somewhat reduced, and the length of the heat path from the heat conducting plate to the thermally actuable element 31 is also somewhat reduced, thereby making the thermal relay somewhat more sensitive.

Referring to Fig. 5 of the drawing, I have there illustrated the use of a thermal relay 26 having a heat radiating plate or fin 42 secured thereto either by extension of the base 27 or by the use of an additional element, whereby I obtain a temperature reducing effect upon the thermal relay, which, in the case of moderate long continued overloads, results in a greater time lag of operation of the relay. One way of making use of this heat radiating fin is to so dimension it, both as to thickness and as to the exposed superficial area thereof, to ensure that the thermal relay will have a time temperature curve of heating and cooling that corresponds very closely to that of the motor energizing winding itself.

Referring to Fig. 6 of the drawing, I have there illustrated a specific form of heat radiating member 43, operatively attached to and extending away from the relay structure 26. The heat radiating fin 43 includes a portion 44 directly operatively associated with the relay 26, which has a relatively small area of cross section through which heat may flow from the relay away therefrom, and also an outer end portion 46, whose superficial area is relatively large compared to the area of the portion 26. I have found this to be quite effective in the refinement of control of the motor by the relay in that the relatively narrow portion 44 will conduct away a predetermined amount of heat from the relay 26 so long as the motor is subjected to a moderate overload only. However, in case of an excessive overload on the order of 600% to 1,000% of normal load, the amount of heat which is generated is so much larger than can be conducted away by the relatively narrow portion 44 that a relatively small proportion of the heat to which the relay 26 is subjected by the adjacent coils is conducted away from the relay, this resulting in a very quick temperature rise of the thermally actuable element, whereby substantially instantaneous operation of the relay is effected.

Referring to Fig. 7 of the drawing, I have there illustrated a modified form of device embodying my invention, in which the thermal relay 26 has associated therewith a heat radiating fin, which may be of substantially the shape shown in Fig. 6, and in which the end portion 46 is in direct operative engagement with one face of the stator laminations 13. A structure of this kind provides not only for heat flow from the outer double layer end turns 47, but also provides for a heat path from the stator laminations to the thermal relay. It may happen under certain conditions of operation of a motor that the stator laminations themselves may have a somewhat higher temperature rise than the energizing winding, and it is highly desirable under such conditions that a heat path be provided to the thermal relay from the stator laminations. Thus, in a rotary converter which may have to operate for relatively long periods of time at little or no load, it is possible that ventilating conditions are such that the stator laminations may have a relatively high temperature while the energizing winding itself may have a substantially lower temperature.

In another modification of the device embodied in my invention, I may make the metal plates 36, 41, 42 or 43 of ferrous material, so that the leakage flux generated by the current traversing the end turn portions of the stator winding can generate eddy currents therein to assist in heating up the heat conducting plates 36 and 41 particularly.

A structure of this kind is shown in Fig. 8, in which the thermal relay 26 with an outwardly extending heat-conducting and heat radiating plate 48 is located between a folded sheet 49 of a suitable electric-insulating material, and in which a relatively small structure of laminated sheet iron 51 is provided, each lamination being of substantially U-shape, the open end extending toward the stator. If the plate 48 is of ferrous material, the use of a flux-carrying structure 51 will, of course, increase the number of flux lines which will traverse the plate 48 so that its temperature may be appreciably increased by the heat generated in plate 48 and conducted to the relay.

It is further obvious that by varying the amount of the magnetic structure 51, which may also be made of a solid piece of ferrous material, I am able to vary the time temperature curve of the relay as may be considered desirable or necessary, particularly so if it is desired to have a relay whose time temperature curve is substantially the same as that of the energizing winding.

It is obvious that by the proper selection of the thermal mass of the relay and by the use of a heat conducting plate, such as the plates 36, 41 or 48, or of a heat radiating plate, such as the plates 42, 43, I can provide any ordinary combination of thermal relay and heat conducting or heat radiating plate as may be necessary to properly cooperate with a motor, and it is only necessary to determine the proper combination for any size of motor, after which it will be found possible to use the same combination structure for all other units of the same size, construction and rating.

It is desirable to locate the thermal relay controlling the energizing circuit of a motor in that place therein where a so-called "hot spot" will occur under abnormal operating conditions, and I have found that the projecting end turn portions are usually the location of such a "hot spot". If the superficial extent of the relay 26 is not very great, as is, of course, necessary in small motors, the use of a heat gathering plate, either magnetic or non-magnetic, will tend to integrate the heat conditions of a plurality of sections over the energizing winding, and may even be employed to provide protection against phase failure if the thermal relay or its heat conducting plate is properly located with regard to the phase connections to the energizing winding (see Fig. 2, where a phase connection is shown at 14A).

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In a motor having a stator and an energizing winding including overlapping end turn portions, a thermal relay having a thermally-actuable element mounted within the end turn portions and supported thereby outside of the stator.

2. In combination with a motor having a stator and a plural coil energizing winding with overlapping end turn portions, a thermal relay including a thermally-actuable element located within and supported by the end turn portions and a heat radiating means operatively connected with the thermally-actuable element.

3. In combination with a motor having a stator and a plural coil energizing winding with overlapping end turn portions, a thermal relay including a thermally-actuable element located within and supported by the end turn portions and means operatively connected to the thermally-actuable element and cooperating therewith to ensure a time lag of operation thereof under certain abnormal operating conditions of the motor.

4. A device as set forth in claim 2 in which the heat radiating means is constituted by a fin extending outwardly of the end turn portions.

5. In combination with a motor having a stator and a plural coil energizing winding with overlapping end turn portions, a thermal relay including a thermally-actuable element located within and supported by the end turn portions and a heat radiating means operatively connected with the thermally-actuable element, and having a portion of relatively small area of cross section adjacent to the thermal element and an outer heat radiating portion of larger area of cross section.

6. In combination with a motor having a stator and a plural coil energizing winding with overlapping end turn portions, a thermal relay including a thermally-actuable element located within and supported by the end turn portions and a heat radiating means operatively connected with the thermally-actuable element, said heat radiating means embodying means to reduce the amount of heat flow therethrough under extreme overload conditions of the motor.

7. In combination with a motor having a stator and a plural coil energizing winding with overlapping end turn portions, a thermal relay including a thermally-actuable element located within and supported by the end turn portions and a heat radiating means operatively connected with the thermally-actuable element, and effective to conduct heat away from the thermally-actuable element under moderate overload conditions of the motor and to retard heat flow therefrom under extreme overload conditions of the motor.

8. In a motor having an energizing winding with overlapping end turn portions, a thermal relay located within the end turn portions and supported thereby, said thermal relay including a base, a contact thereon, a thermally-actuable element on the base, and a casing over the thermally-actuable element, whereby both sides of thermally-actuable element are subjected to heat from the end turn portions.

9. In combination with a motor having an energizing winding including end turn portions, a thermal relay including a thermally-actuable element and a heat-transmitting metal plate operatively connected to the thermally-actuable element, the metal plate being located between and firmly held by the end turn portions.

10. In combination with a motor having an energizing winding including double layer end turn portions, a thermal relay including a thermally-actuable member of relatively small surface area, and a heat-transmitting plate of larger area in direct operative surface contact with the thermally-actuable member, a portion of said plate being located between the layers of the end turn portions.

11. In combination with a motor having a two layer energizing winding with overlapping end turn portions, a thermal relay including a snap-acting bimetal disc of relatively small surface area and a heat-transmitting metal plate of larger area in operative surface contact with the bimetal disc, a portion of said plate being located between and firmly held by the layers of the end turn portions.

HAROLD E. COBB.